United States Patent [19]

Mottate

[11] Patent Number: 4,961,649
[45] Date of Patent: Oct. 9, 1990

[54] FINITE LINEAR MOTION ROLLING GUIDE UNIT

[75] Inventor: Tatsuo Mottate, Mitaka, Japan

[73] Assignee: Nippon Thompson Co., Ltd., Tokyo, Japan

[21] Appl. No.: 378,413

[22] Filed: Aug. 14, 1989

[30] Foreign Application Priority Data

Oct. 31, 1988 [JP] Japan ............................. 63-140998[U]
Oct. 31, 1988 [JP] Japan ............................. 63-140999[U]
Oct. 31, 1988 [JP] Japan ............................. 63-272990[U]

[51] Int. Cl.⁵ ............................................. F16C 29/04
[52] U.S. Cl. ........................................... 384/49; 384/57
[58] Field of Search ..................... 384/49, 18, 45, 43, 384/19, 57

[56] References Cited

U.S. PATENT DOCUMENTS 3,857,618 12/1974 Hagen et al. ........................... 384/18
4,610,488 9/1986 Geka ...................................... 384/45
4,692,039 9/1987 Termachi ............................... 384/49

Primary Examiner—Lenard A. Footland
Attorney, Agent, or Firm—Rogers & Killeen

[57] ABSTRACT

The present invention provides a finite linear motion rolling guide unit comprising: a track member; and a link mechanism for holding ball rolling members which is arranged between vertically depending track portions of a sliding member which rides over the track member through the ball rolling members so as to be finitely linearly slidable. The link mechanism is simply constructed by two or more link arm members. In the relative reciprocating motion at any speed of the track member and the sliding member, a deviation movement thereof from the normal position of the ball linear moving members is prevented and, at the same time, the smooth and stable linear motion rolling guiding operation of the balls is assured.

6 Claims, 7 Drawing Sheets

FIG. I

FINITE LINEAR MOTION ROLLING GUIDE UNIT

BACKGROUND OF THE INVENTION

1. Field of the Invention

The present invention relates to a finite linear motion rolling guide unit which is used under compound load in a precise assembling work of electronic parts or the like.

2. Description of the Related Background Art

Conventional finite linear motion rolling guide units disclosed in, for instance, U.S. Pat. Ser. Nos. 3,857,618, 4,662,763, 4,610,488, and 4,253,709 and Japanese Patent Application Disclosure Nos. 38216-1986 and 266823-1986 and the like have the following drawbacks. When such a rolling guide unit is operated by the reciprocating motion at a relatively high speed, a deviation of ball assemblies with holders occurs between the side surface of a track member and the inner side surface of a sliding member. Such a deviation phenomenon of the holders occurs because the positions of the ball assemblies are gradually deviated in one direction due to the inertial forces of the holders which hold the balls. Finally, the ball assembly collides with a stopper for the holder and, in this portion, an abnormal abrasion occurs or a sliding abrasion due to the deviation of the balls occurs. Thus, such a deviation phenomenon becomes causes of the burning of the unit and the short life thereof.

To prevent such a deviation, hitherto, a method whereby the surface of each ball is made rough or a method whereby a rack is formed on the track member and a pinion is attached to the holder, or the like has been used. However, such a method is still insufficient for prevention of the deviation or causes the costs to be increased due to various attached members. A proper method of solving the deviation is not developed yet.

SUMMARY OF THE INVENTION

It is an object of the present invention to solve the foregoing drawbacks of the conventional finite linear motion rolling guide unit and to provide a finite linear motion rolling guide unit in which its mechanism is the simplest and the unit can be cheaply manufactured and a deviation upon sliding motion of a holder can be accurately prevented. The invention having a construction disclosed in each of claims has been made.

With the construction of the invention, even if a sliding member is slidingly reciprocated on a track member at a high speed, the deviations on the tracks of ball assemblies with holders which are interposed as rectilinear motion rolling guide units between the side walls of both members are always stably controlled by the operation of a link mechanism assembled with the holders. At the same time, the stress to the holder can be limitedly made act on only its sliding direction.

Still another object of the invention is to provide a finite linear motion rolling guide unit in which a link mechanism of an extremely simple structure is used, the unit can be cheaply manufactured, a ball holder can be stably supported, an excessive deviation movement can be certainly prevented, the unit can be easily assembled, the maintenance inspecting works can be easily executed, and the noises upon operation are extremely low.

Still another object of the invention is to provide a finite linear motion rolling guide unit in which a link mechanism having an extremely simple structure and a small width (that is, which is narrower than the whole width of a track member 1) is used, it is sufficient to use only one link arm, the unit can be easily and cheaply manufactured, a ball holder can be stably supported, an excessive deviation movement can be certainly prevented, the unit can be easily assembled, the mainenance inspection works can be easily performed, and the noises upon working are extremely low.

Still another object of the invention is to provide a finite linear motion rolling guide unit in which the operation to control the position of a holder is executed by the force in only its sliding direction, a mechanical friction is reduced, and the noises upon operation are extremely low.

DETAILED DESCRIPTION OF THE PREFERRED EMBODIMENTS

Figure 1:
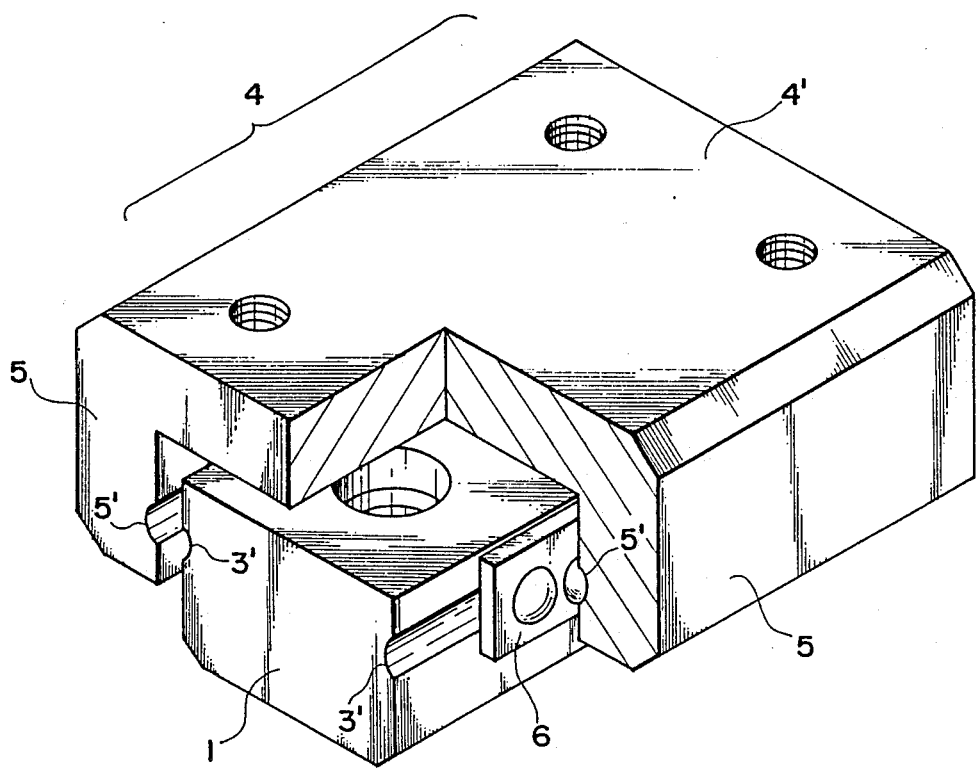
FIG. 1 is a partially cross sectional perspective view showing a fundamental structure of a linear motion rolling guide unit according to the present invention and illustrates a ball holder 6 with a part cut away.

FIG. 1 is a partially cross sectional perspective view showing a fundamental structure of a linear motion rolling guide unit according to the first practical example of the present invention and illustrates a ball holder 6 with a part cut away. A holder deviation preventing link mechanism is not shown in the diagram since it is located below the lower surface of a sliding member 4 and cannot be seen in this state.

Figure 2:
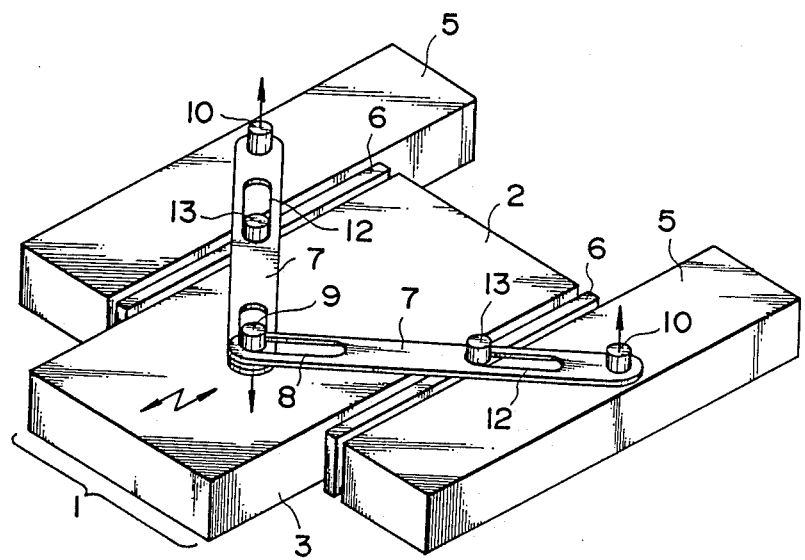
FIG. 2 shows the first practical example of the present invention and is a perspective view showing a state in which a flat plate-shaped upper portion of a sliding member 4 is eliminated to clearly illustrate a holder deviation preventing link mechanism.
Figure 3:
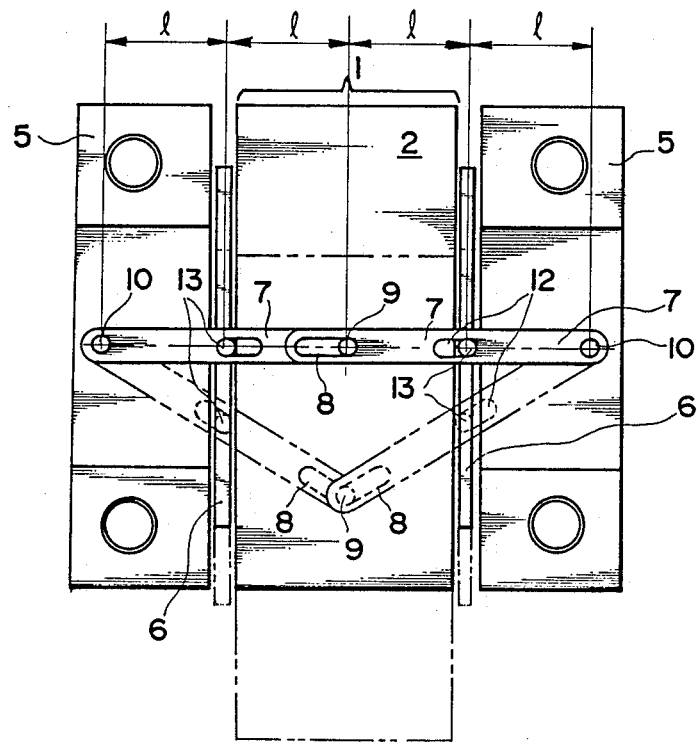
FIG. 3 is a vertex plan view of the perspective view of FIG. 2.

As shown in FIGS. 2 and 3, the finite linear motion rolling guide unit of the invention is constructed by a prism-shaped track member 1 having an almost square cross section; the sliding member 4; track grooves 3' formed on the track groove 1; track grooves 5' formed on the sliding member 4; and a number of balls 14. The sliding member 4 comprises a flat plate-shaped upper portion 4' having a flat surface vertex portion and a pair of vertically depending track portions 5 which are vertically downwardly formed on both sides with respect to a vertical axis of the upper portion 4'. The whole cross sectional view of the sliding member 4 has an almost inverse U-shape. The sliding member 4 is arranged so as to slidably ride over the track member 1 due to the concave portion of the lower surface. The track grooves 3' are formed on side wall surfaces 3 on both sides of the track member 1. Load balls 14 constructing a linear motion rolling guide unit are come into contact with the track grooves 3'. At the positions corresponding to the track grooves 3', the track grooves 5' are formed on the inner side wall surfaces of the vertically depending track portions 5 of the sliding member 4, respectively. The balls 14 are sandwiched between the tracks 3' and 5' and are held by the holder 6 so as to freely run.

FIG. 2 is a perspective view showing a horizontal vertex portion surface 2 of the track member and the upper surfaces of the vertically depending track portions and illustrates a state in which the flat plate-shaped upper portion 4' of the sliding member 4 in FIG. 1 is eliminated in order to easily explain the holder deviation preventing link mechanism of the invention. FIG. 2 clearly shows a holder supporting link mechanism of the invention. The link mechanism of the invention has the following special construction to prevent an undesirable positional deviation between the holder and each of the members engaging therewith during the operation of the rolling guide unit.

As shown in FIGS. 2 and 3, the link mechanism comprises a pair of arms 7 having a symmetrical structure. A circular opening is formed at one end of each arm 7. A pin 10 fixed to each of the vertically depending track portions 5 on both sides of the sliding member 4 is fitted into the circular opening of the arm 7, thereby positioning the rotational center of the arm. An almost elliptic or oblong opening 8 is formed on the other end of each arm 7 in its axial direction. A pin 9 fixed on the central axial line of the track member 1 is loosely fitted into the oblong opening 8 so as to be movable in the direction of the major axis of the oblong opening 8. Further, an oblong opening 12 of the same shape as the oblong opening 8 is formed on each arm 7 at the position corresponding to the half of the distance between the pins 10 and 9. A guide pin 13 which is fixed to or is integrally formed with the upper edge of the holder is loosely fitted into each oblong opening 12 so as to be movable in the vertical axial direction.

The pins 10 formed on the vertically depending track portions 5 are arranged at the symmetrical positions of the vertically depending track portions 5 and at the positions such that the outer edge portions of the arms 7 are always rotated in the upper surface areas on the vertically depending track portions 5.

As shown in FIG. 3, it is preferable to arrange the pins 10 and 9 in a line at the positions of the track member 1 and sliding member 4 in the inoperative mode of the unit.

Since the arms 7 have the similar shape, the same parts and elements are designated by the same reference numerals in the diagrams.

Figure 4:
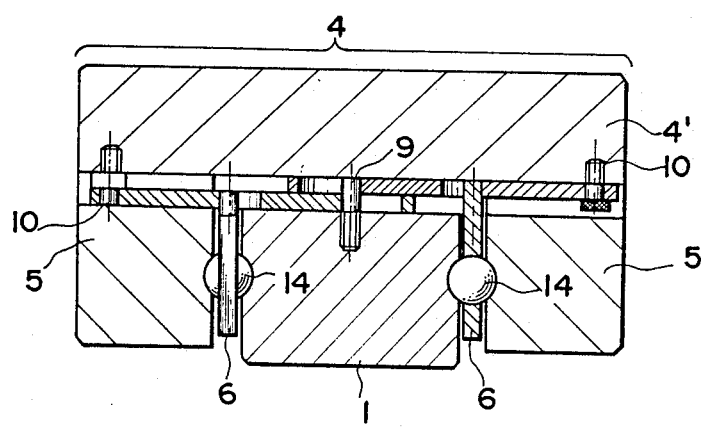
FIG. 4 is a cross sectional view taken along the plane which is perpendicular to an axial direction in FIG. 3.

As will be obvious from FIGS. 2 and 4, the arms 7 are extended in parallel with the vertex portion flat surface 2 of the track member 1. In the case of the example shown in the diagrams, the arms are held in a manner such that the loosely fitted end portions of both arms are vertically overlaid at the pin 9 on the track member 1. The other ends of the arms are pivotally attached to the pins formed on the vertically depending track portions 5 of the sliding member 4 and/or the lower surface of the vertex plate 4' so that the arms are located in parallel with the vertex portion flat surface 2 of the track member 1.

FIG. 3 shows a vertex plan view of the perspective view of FIG. 2 and illustrates the positional relations of the link mechanism and holders for the sliding member 4 before the track member 1 is slidingly moved (solid lines) and after the track member 1 was slidingly moved (alternate long and two short dashes lines).

As will be obvious from FIG. 3, the relative reciprocating sliding motion of the track member 1 for the sliding member 4 or of the sliding member 4 for the track member 1 is restricted by the link mechanism. That is, the relative reciprocating motion is permitted in the sliding direction within a range where the pair of link arms 7 are rotated around their pins 10 as rotational centers and the outer edge portions of the inner end oblong openings 8 of the arms 7 are come into contact with the pin 9 of the track member. The guide pins 13 each of which is formed on the upper edge of the holder 6 and is loosely held in the oblong opening 12 formed at an almost intermediate position between both ends of each link arm 7 are also moved within the allowable moving range in the intermediate oblong openings 12. Further, in the preferred embodiment of the invention, a distance l between the center of the rotational pin 10 on the side of the sliding member to make the same link arm operative at the non-sliding position (solid lines) of the unit shown in FIG. 3 and the center of the guide pin 13 of the holder is equal to the distance l between the center of the pin 9 formed at the center on the track member and the center of the guide pin 13. Therefore, a distance between the centers of both of the guide pins 13 on both sides of the track member is equal to 2l. In accordance with this distance, the oblong openings 12 in the edge portions and the oblong openings 12 in the intermediate portions are formed in the link arms. Thus, the excessive movement of the holder in either one direction on the track can be completely prevented.

In the embodiment shown in FIGS. 2 to 4, the sliding pin 10 has been constructed as a rotational center of each link arm 7. However, the similar operations and advantages can be also accomplished even by a structure such that the track pin 9 is used as a rotational center and the sliding pin 10 is loosely fitted into the oblong openings.

In the foregoing practical example, the link mechanism has been constructed by total two elements of a pair of link arms. However, it will be obvious that the similar operation and advantages are obtained in the case of constructing the link mechanism by three or more elements on the basis of the same principle.

Figure 5:
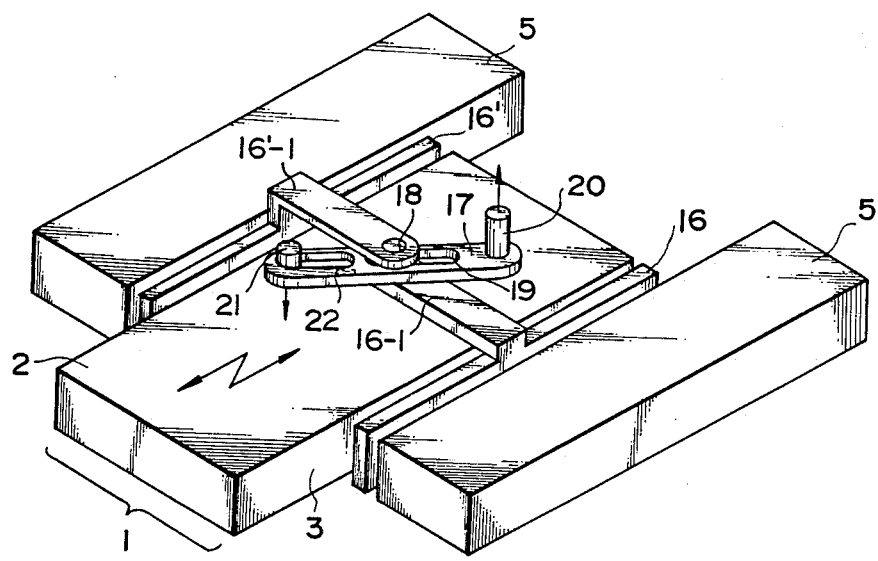
FIG. 5 shows the second practical example of the present invention and is a perspective view showing a state in which the flat plate-shaped upper portion of the sliding member 4 is eliminated to clearly illustrate the holder deviation preventing link mechanism.
Figure 6:
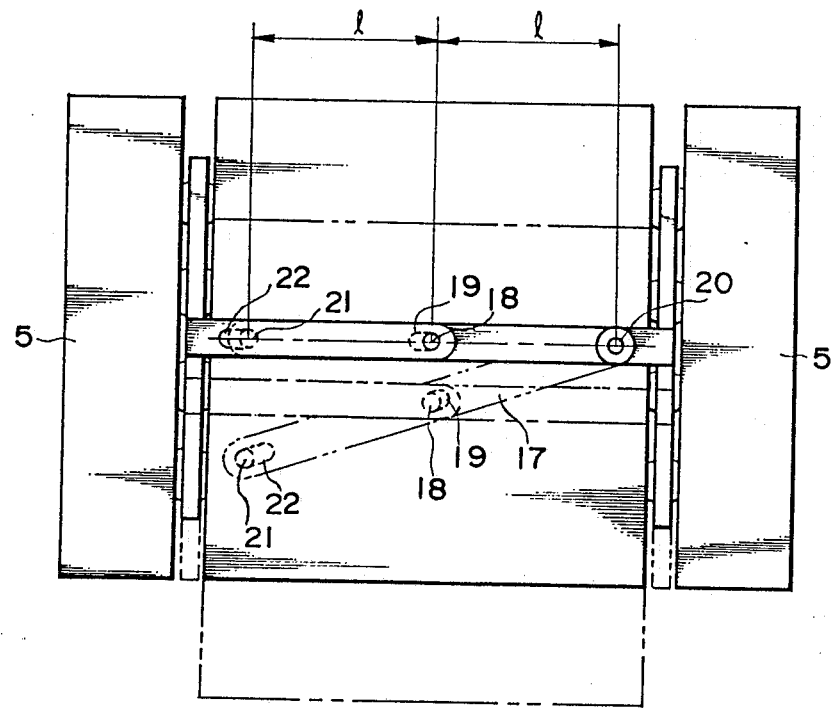
FIG. 6 is a vertex plan view of the perspective view of FIG. 5.
Figure 7:
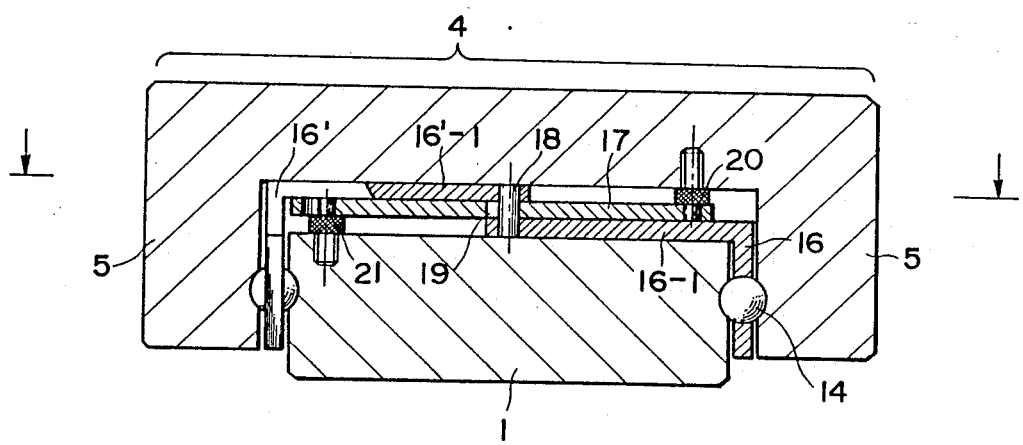
FIG. 7 is a cross sectional view taken along the plane which is perpendicular to an axial direction in FIG. 6.

FIGS. 5 to 7 show a link mechanism of a guide unit as the second practical example of the invention. As shown in FIGS. 5 and 6, the link mechanism comprises one arm 17 shorter than the whole width of the track member 1. A circular opening is formed at one end of the arm 17. A pin 20 fixed to the back surface of the flat plate-shaped upper portion 4' at a position between the vertically depending track portions 5 on both sides of the sliding member 4 is fitted into the circular opening of the arm 17, thereby positioning the rotational center of the arm. An almost elliptic or oblong opening 22 in the axial direction is formed at the other end of the arm 17. A pin 21 fixed onto the horizontal vertex portion surface 2 of the track member 1 is loosely fitted into the oblong opening 22 so as to be movable in the direction of its major axis. An oblong opening 19 of the same shape as the oblong opening 22 is further formed in the arm 17 at a position corresponding to the half of the distance between the pins 20 and 21. Coupling tip pins 18 of a pair of holder supporting arms 16-1 and 16'-1 which are fixed to or integrally formed with the upper edges of holders 16 and 16' are loosely fitted into the oblong opening 19 so as to be movable in the vertical axial direction.

The pin 21 formed on the horizontal vertex portion surface 2 of the track member 1 and the pin 20 fixed to the back surface of the flat plate-shaped upper portion 4' of the sliding member 4 are arranged at symmetrical positions which are perpendicular to the sliding direction in an aligned state of the members 1 and 4, that is, in their inoperative state (indicated by solid lines in FIG. 6). Further, the pin 21 is arranged at a position such that the whole arm 17 is always rotated around the pin 20 as a rotational center in the horizontal vertex portion surface 2 of the track member upon operation of the arm 17.

As shown in FIG. 6, at the aligned positions of the track member 1 and sliding member 4 in the inoperative mode of the unit, it will be understood that the centers of the pins 20, 18, and 21 are aligned in a line and a distance between the centers of the pins 18 and 20 is equal to a distance between the centers of the pins 18 and 21 and is set to 1.

As will be obvious from FIGS. 5 to 7, the holder supporting arms 16-1 and 16'-1 which are fixed to or integrally formed with the central portions of the upper edges of the pair of holders and are extended in the direction perpendicular to the holder surfaces so as to have lengths each of which is longer than the half of the whole width of the track member 1 and are arranged on the vertex portion flat surface 2 o the track member 1 and are extended horizontally in the direction perpendicular to the axial line. The edge portions of the supporting arms 16-1 and 16'-1 are integrally coupled by the holder coupling pins 18 so as to vertically overlaid. The coupling pins 18 also pierce through the oblong opening 19 in the intermediate portion of the arm 17. Thus, the overlaid edge portions of the arms 16-1 and 16'-1 are coupled by the pins 18 through the intermediate oblong opening 19 of the arm 17. As shown in FIG. 7, to horizontally extend the supporting arms 16-1 and 16'-1 along the vertex portion flat surface 2 of the track member 1, it is necessary to form height different portions at the attaching height positions of the supporting arms of both holders.

FIG. 6 shows a vertex plan view of the perspective view of FIG. 5 and illustrates the positional relations between the link mechanism and the holders for the sliding member 4 before the track member 1 is slidingly moved (solid lines) and after the track member 1 was slidingly moved (alternate long and two short dashes lines).

As will be obvious from FIG. 6, the relative reciprocating sliding motion of the track member 1 for the sliding member 4 or of the sliding member 4 for the track member 1 is restricted by the link mechanism. That is, the relative reciprocating motion is permitted in the sliding direction of the sliding member 4 within a range where the link arm 17 rotates around the pin 20 as a rotational center and the outer edge portion of the oblong opening 22 at the distal end of the arm is come into contact with the pin 21 of the track member 1. The coupling pins 18 formed at the edges of the supporting arms 16-1 and 16'-1 of the holders 16 and 16' which are loosely fitted and held into the oblong opening 19 formed at an almost intermediate position of the link arm 17 are also come into contact with the edge portion of the intermediate oblong opening 19 and are movable within its allowable moving range. Thus, the excessive movement of the holders in either one direction on the track can be completely prevented.

The distance between the centers of the pins 18 and 20 and the distance between the centers of the pins 18 and 21 are equal and are set to 1 and the ratio between both distances is set to 1:1. Therefore, when the arm 17 rotates around the pin 20 on the side of the sliding member as a rotational center, the distance in the sliding direction between the pin 20 on the sliding member side and the holder coupling pin 18 is restricted so as to always become ½ of the distance between the pin 20 on the sliding member side and the pin 21 on the track member side.

Although the embodiment shown in FIGS. 5 to 7 has been constructed such that the pin 20 on the sliding member side is set to a rotational center of the link arm 17, the similar operation and advantages can be also accomplished by using a structure such that the pin 21 on the track member side is set to a rotational center and the pin 20 on the sliding member side is loosely fitted into the oblong opening.

Figure 8:
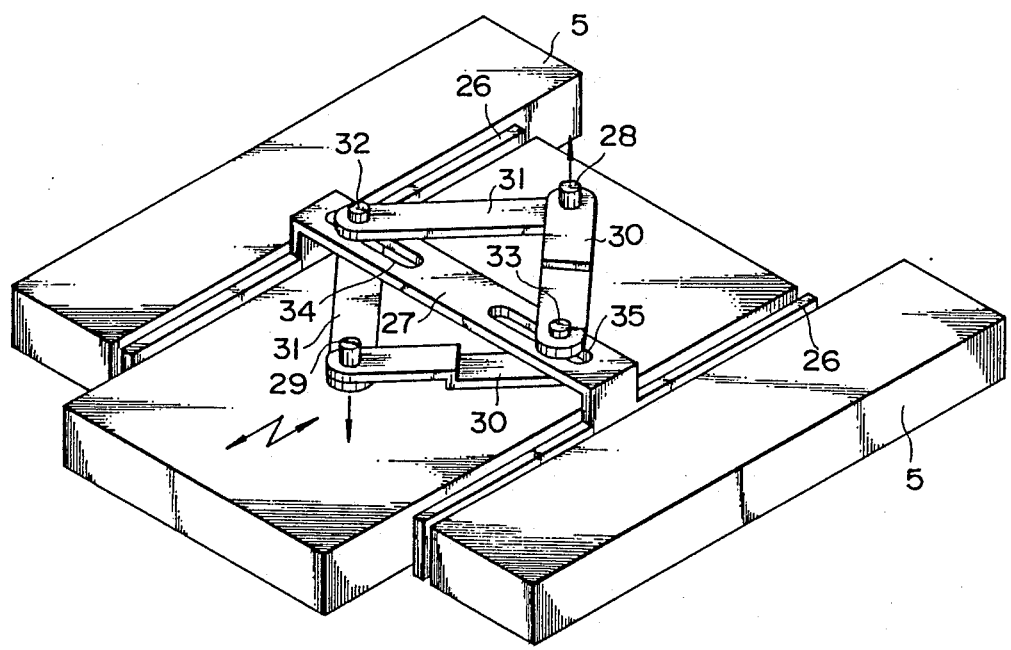
FIG. 8 shows the third practical example of the present invention and is a perspective view showing a state in which the flat plate-shaped upper portion of the sliding member 4 is eliminated to clearly illustrate the holder deviation preventing link mechanism.
Figure 9:
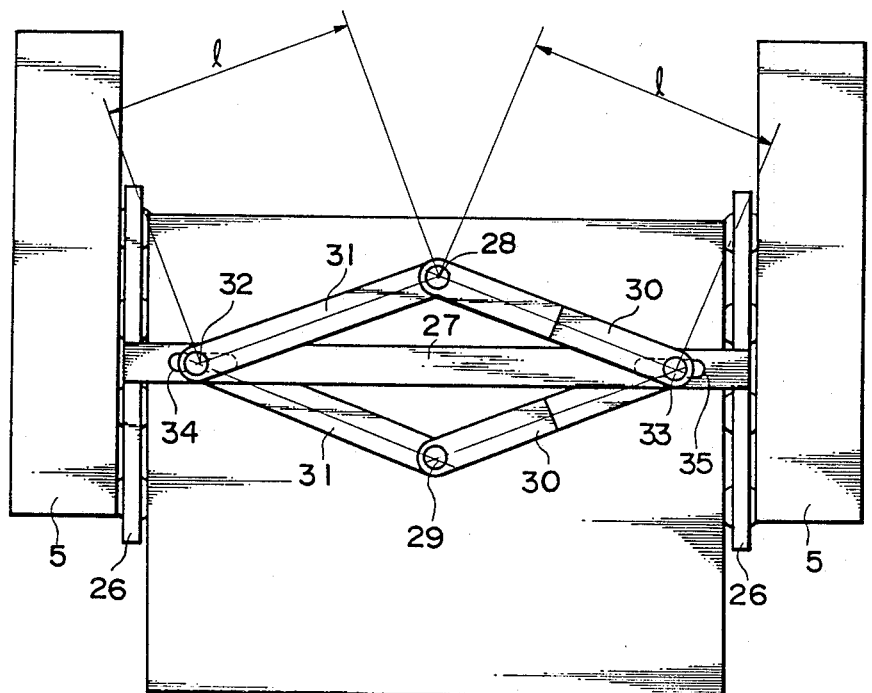
FIG. 9 is a vertex plan view of the perspective view of FIG. 8.
Figure 10:
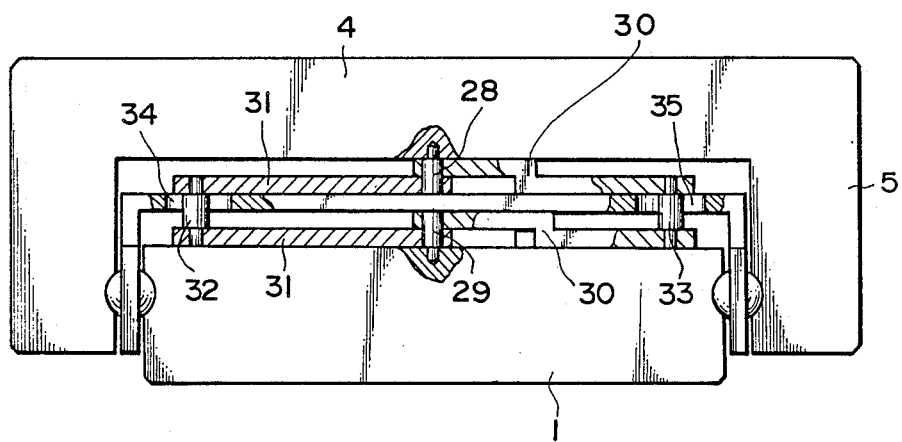
FIG. 10 is a cross sectional view taken along the plane which is perpendicular to an axial direction in FIG. 9.

A link mechanism as the third practical example of the invention shown in FIGS. 8 to 10 has the following construction.

FIG. 8 is a perspective view showing the horizontal vertex portion surface 2 of the track member and the upper surfaces of the vertically depending track portions 5 and illustrates a state in which the flat plate-shaped upper portion 4' of the sliding member 4 in FIG. 1 are eliminated for easily explaining the holder deviation preventing link mechanism of the present invention. The diagram illustrates a horizontal link mechanism to control the holder deviation according to the invention. The link mechanism of the invention has the following special construction to prevent an undesirable positional deviation between the holder and each of the engaging members during the operation of the guide unit.

As will be obvious from FIGS. 8 to 10, a pair of holders 26 have a plate-shaped holder coupling arm 27 by which both holders are integrally coupled. The coupling arm 27 is fixed to or integrally formed with the central portions of the upper edges of the holders 26 and is formed like an H-shape. That is, the arm 27 is formed perpendicularly to the planes in the longitudinal direction of the holders 26 and is horizontally extended while transversing the whole width of the track member 1. A pair of elliptic or oblong openings 35 and 36 whose major axes are set in the axial direction are formed in both end portions of the coupling arm 27 at positions of equal distances which are close to the central portions of the upper edges of the holders 26.

As clearly illustrated in FIGS. 8 and 9, a horizontal link arm assembly constructing the link mechanism comprises a combination of two upper and lower link pairs having a similar structure. Each of the link pairs consists of two kinds of hetero arm members 30 and 31. Thus, the link arm assembly comprises total four arm members of two kinds as a whole.

The arm members 30 and 31 have substantially the same shaft length shorter than the whole length of the coupling arm 27. In the example shown in the diagrams, the arm member 30 has a flat shape and the arm member 31 has a height different shape.

The flat plate-shaped arm 31 is formed as a flat strip member and has circular openings at both end portions. The height different flat arm 30 has a height different portion in the almost central portion as shown in FIGS. 8 and 10 but the other portions are formed by a flat strip member. The arm 30 has the shaft length which is substantially equal to the arm 31 and circular openings are likewise formed at both ends of the arm 30.

The horizontal link arm assembly as the third practical example of the invention is constructed by the above two kinds of total four arm members 30 and 31 in the following manner.

As shown in FIGS. 9 and 10, one end of the flat arm 31 and one upper end portion of the height different flat arm 30 are overlaid in contact relation with each other. The circular openings formed in these end portions are concentrically pivotally fitted to a pin 28 on the sliding member side, thereby constructing an upper link pair. The pin 28 is fixed to the lower surface of the flat plate-shaped upper portion 4' of the sliding member 4 and on its central vertical axis.

In a manner similar to the above, one end of the arm 31 and one upper end portion of the arm 30 are overlaid so as to make their circular openings coincide and are pivotally fitted to a pin 29 on the track member side, thereby constructing a lower link pair. The pin 29 is fixed onto the horizontal vertex portion surface 2 of the track member 1 and on its central vertical axis.

Free ends of the upper and lower link pairs constructed as mentioned above are arranged such that the circular openings formed in the mutual corresponding end portions are located at the same position. That is, the free ends (on the left side in FIG. 8) of the arms 31 are vertically arranged through the oblong opening 34 of the coupling arm 27 so as to face each other. The free ends (on the right side in FIG. 8) of the arms 30 are likewise vertically arranged through the oblong opening 35 of the coupling arm 27 so as to face each other. A pivot pin 32 is vertically pierced through the circular openings of the left free end pair of the arms 31 and through the oblong opening 34. A pivot pin 33 is similarly vertically pierced through the circular openings of the right free end pair of the arms 30 and through the oblong opening 35. In this manner, the upper and lower link pairs are loosely movably coupled by the pivot pins 32 and 33 through the oblong openings 34 and 35 of the coupling arm 27. Thus, the left and right free end pairs of the upper and lower link pairs are rotatable around the pivot pins 32 and 33 as rotational centers and, at the same time, are movable in the directions of the major axes of the oblong openings 34 and 35 on both sides of the coupling arm 27. As clearly shown in FIG. 9, the distance between the pin 28 and the pivot pin 32, the distance between the pin 28 and the pivot pin 33, the distance between the pin 29 and the pivot pin 32, and the distance between the pin 29 and the pivot pin 33 are always held to be equal to l.

As shown in FIG. 10, the horizontal link arm assembly is constructed by the upper and lower link pairs and each of the upper and lower link pairs is constructed by the flat arm 31 and the height different flat arm 30, so that both of the upper and lower link pairs are always horizontally held on the upper and lower planes of the holder coupling arm 27.

As will be obvious from FIG. 9, the relative reciprocating sliding motion of the track member 1 for the sliding member 4 or of the sliding member 4 for the track member 1 is restricted by the horizontal link arm assembly of the invention having the foregoing structure. In other words, the arms 30 and 31 of the upper and lower link pairs rotate around the pins 28 and 29 as rotational centers and, at the same time, the pivot pins 32 and 33 to pivotally attach the free ends of the arms 30 and 31 are moved in the directions of the major axes in the oblong openings 34 and 35 formed in both end portions of the coupling arm 27. Therefore, what is called a pantograph type link is provided. The relative reciprocating sliding motions which are symmetrical with respect to line of the upper and lower link pairs are permitted within the coupling arm 27 within a movable range of the link arm assembly. The coupling arm 27 is always held at the intermediate position in the sliding direction between the pin 28 on the sliding member side and the pin 29 on the track member side during the relative reciprocating sliding motion. Consequently, the excessive movement of the holders in either one direction on the track can be completely prevented.

Although the present invention has been described with respect to the preferred embodiments, the invention is not limited to the foregoing embodiments but many modifications and variations are possible within the spirit and scope of the appended claims of the invention.

What is claimed is:

1. A finite linear motion rolling guide unit comprising:
    a track member (1) which has a horizontal vertex portion surface (2) and in which a cross sectional view has an almost square prism shape and track grooves (3') of balls are formed on both side surfaces;
    a sliding member (4) whose cross sectional view has an almost inverse U-shape and which is constructed by a flat plate-shaped upper portion (4') and a pair of vertically depending track portions (5) having a similar shape which depend on both sides of said flat plate-shaped upper portion (4'), said sliding member (4) being arranged so as to ride over said track member (1) so as to be slidable in its axial direction;
    a pair of ball assemblies (6) with holders in which track grooves (5') corresponding to said track grooves (3') of the track member (1) are formed on both inner side surfaces of said pair of vertically depending track portions (5) and which are arranged between the track grooves (5') of the vertically depending track portions (5) and the track grooves (3') of the track member (1), respectively; and
    a link mechanism consisting of two or more arms for mutually pivotally coupling said track member (1), said sliding member (4), and said ball assemblies (6) and for restricting the motions in the sliding direction of the ball assemblies in said track grooves (3' and 5') upon relative sliding motions of the track member and the sliding member.

2. A finite linear motion rolling guide unit comprising:
    a track member (1) which has a horizontal vertex portion surface (2) and in which a cross sectional view has an almost square prism shape and track grooves (3') of balls are formed on both side surfaces;

a sliding member (4) whose cross sectional view has an almost inverse U-shape and which is constructed by a flat plate-shaped upper portion (4') and a pair of vertically depending track portions (5) having a similar shape which depend on both sides of said flat plate-shaped upper portion (4'), said sliding member (4) being arranged so as to ride over said track member (1) so as to be slidable in its axial direction;

a pair of ball assemblies (6) with holders in which track grooves (5') corresponding to said track grooves (3') of the track member (1) are formed on both inner side surfaces of said pair of vertically depending track portions (5) and which are arranged between the track grooves (5') of the vertically depending track portions (5) and the track grooves (3') of the track member (1), respectively; and a pair of horizontal link arms (7) in each of which an oblong opening (8) is formed at one end, a pin (9) fixed onto said horizontal vertex portion surface (2) of the track member (1) and on its central longitudinal axis is loosely slidably fitted into said oblong opening (8), the other end is pivotally fitted to a pin (10) fixed to the upper end of each of the vertically depending track portion (5) of the sliding member (4), and an oblong opening (12) is formed in almost an intermediate portion between said both ends, wherein a pin (13) which is formed so as to be projected on an upper edge of the holder of each of the ball assemblies (6) is slidably loosely held in each of said oblong openings (12) formed in the link arms (7), and each of the horizontal link arms (7) is rotatable around each of the pins (10) on the side of said sliding member (4) as a rotational center.

3. A unit according to claim 2, wherein one end portion of each of said horizontal link arms (7) is pivotally fitted to the pin (9) fixed onto the horizontal vertex portion surface (2) of the track member (1) and on its central longitudinal axis, a circular opening is formed at the other end, the pin (10) fixed to the upper portion of each of the vertically depending track portions (5) of the sliding member (4) is slidably loosely fitted into said circular opening, and each of the horizontal link arms (7) is rotatable around the pin (9) on the track member side as a rotational center.

4. A finite linear motion rolling guide unit comprising:

a track member (1) which has a horizontal vertex portion surface (2) and in which a cross sectional view has an almost square prism shape and track grooves (3') of balls are formed on both side surfaces; a sliding member (4) whose cross sectional view has an almost inverse U-shape and which is integrally constructed by a flat plate-shaped upper portion (4') and a pair of vertically depending track portions (5) having a similar shape which depend on both sides of said flat plate-shaped upper portion (4'), said sliding member (4) being arranged so as to ride over said track member (1) so as to be slidable in its axial direction;

a pair of ball assemblies (16) with holders in which track grooves (5') corresponding to said track grooves (3') of the track member (1) are formed on both inner side surfaces of said pair of vertically depending track portions (5) and which are arranged between the track grooves (5') of the vertically depending track portions (5) and the track grooves (3') of the track member (1), respectively; and a horizontal link arm (17) which is movably provided over the horizontal vertex portion surface (2) of the track member (1), wherein supporting arms (16-1, 16'-1) are formed on the central portions of the upper edges of the holders of said ball assemblies (16) in the direction perpendicular to axial lines in the longitudinal directions of the holders so as to be horizontally inwardly extended like an H-shape by distances each of which is longer than ½ of a whole width of the track member (1), one end portion of each of the supporting arms (16-1, 16'-1) of the holders (16, 16') which face from both sides is overlaid, said end portions are integrally coupled by a holder coupling pin (18), the holders (16, 16') are positioned in parallel with both side surfaces (3) of the track member (1) to thereby form a linear motion rolling guide unit, a whole length of the horizontal link arm (17) is narrower than a whole width of the horizontal vertex portion surface (2) of the track member (1), one end portion of the link arm (17) is pivotally fitted to a pin (20) on the sliding member side which is used as a rotational center and is fixed to the lower surface of the flat plate-shaped upper portion (4') of the sliding member (4), an oblong opening (22) is formed in the other end portion of the arm (17), a pin (21) on the track member side fixed to the horizontal vertex portion surface (2) of the track member (1) is loosely fitted into said oblong opening (22), a restricted movement in the longitudinal direction of said pin (21) in the oblong opening (22) is permitted, an oblong opening (19) similar to the oblong opening (22) is also formed in an almost intermediate portion of the arm (17), said end portions of the supporting arms (16-1, 16'-1) of the holders (16, 16') are integrally coupled by said coupling pins (18) through said oblong opening (19), and a restricted movement in the longitudinal direction of said coupling pins (18) in said oblong opening (19) in the intermediate portion of the arm (17) is permitted.

5. A unit according to claim 4, wherein one end portion of said horizontal link arm (17) is pivotally attached to the pin (21) on the track member side which is used as a rotational center and is fixed to the horizontal vertex portion surface (2) of the track member (1), an oblong opening is formed in the other end portion of the arm (17), the pin (20) on the sliding member side which is fixed to the lower surface of the flat plate-shaped upper portion (4') of the sliding member (4) is loosely fitted into said oblong opening formed in the other end portion, and a restricted movement in the longitudinal direction of the pin (20) in said oblong opening is permitted.

6. A finite linear motion rolling guide unit comprising:

a track member (1) which has a horizontal vertex portion surface (2) and in which a cross sectional view has an almost square prism shape and track grooves (3') of balls are formed on both side surface;

a sliding member (4) whose cross sectional view has an almost inverse U-shape and which is integrally constructed by a flat plate-shaped upper portion (4') and a pair of vertically depending track portions (5) having a similar shape which depend on both sides of said flat plate-shaped upper portion (4'), said sliding member (4) being arranged so as to ride over said track member (1) so as to be slidable in its axial direction;

a pair of ball holders (26) with a plate-shaped coupling arm (27) in which track grooves (5') corresponding to said track grooves (3') of the track member (1) are formed on both inner side surfaces of said pair of vertically depending track portions (5) and which are arranged between the track grooves (5') of the vertically depending track portions (5) and the track grooves (3') of the track member (1), respectively; and a horizontal link arm assembly which is movably provided over and below the coupling arm (27) of the holders (26), wherein the coupling arm (27) of the holders integrally couples the opposite upper edge central portions of the pair of holders (26), which are arranged in parallel, in the direction perpendicular to the plane of each of said holders (26), a pair of oblong openings (34, 35) are formed in the coupling arm (27) at positions of an equal distance which are close to the upper edge central portions of the holders (26), said horizontal link arm assembly comprises total four arm members (30, 31) constructing two upper and lower link pairs having a similar structure, each of the arm members (30, 31) of each of said link pairs is shorter than a whole length of said coupling arm (27), the arm member (31) is formed in a flat shape, the other arm member (30) is formed in a flat shape with a height different portion, one end of each of the arm members (30, 31) is overlaid and come into contact with each other and the other ends of the arm members (30, 31) are extended on the same plane upon formation of the link pairs, the upper link pair is fixed onto the lower surface of the flat plate-shaped upper portion (4') of the sliding member (4) and on its central vertical axis at said overlaid contact ends and is pivotally attached to a pin (28) on the sliding member side as a rotational center of the upper link pair, the lower link pair is also similarly fixed on the central vertical axis of the horizontal vertex portion surface (2) of the track member (1) at its overlaid contact ends and is pivotally attached to a pin (29) on the track member side as a rotational center of the lower link pair, the mutual corresponding end portions of the other end portions of said upper and lower link pairs are pivotally attached on both of the upper and lower surfaces of the coupling arm (27) by pivot pins (32, 33) which are pierced through and are loosely fitted into the pair of oblong openings (34, 35) formed in the coupling arm (27), respectively, and thereby constructing a pantograph-shaped horizontal link arm assembly by said link pairs which is movable in the lateral axis direction within major axis ranges of said pair of oblong openings (34, 35) formed in the coupling arm (27) by using each of the pin (28) on the sliding member side and the pin (29) on the track member side as a rotational center.

* * * * *